April 4, 1939.  E. C. HORTON  2,153,519
WINDOW CLEARING SYSTEM
Filed Jan. 21, 1936
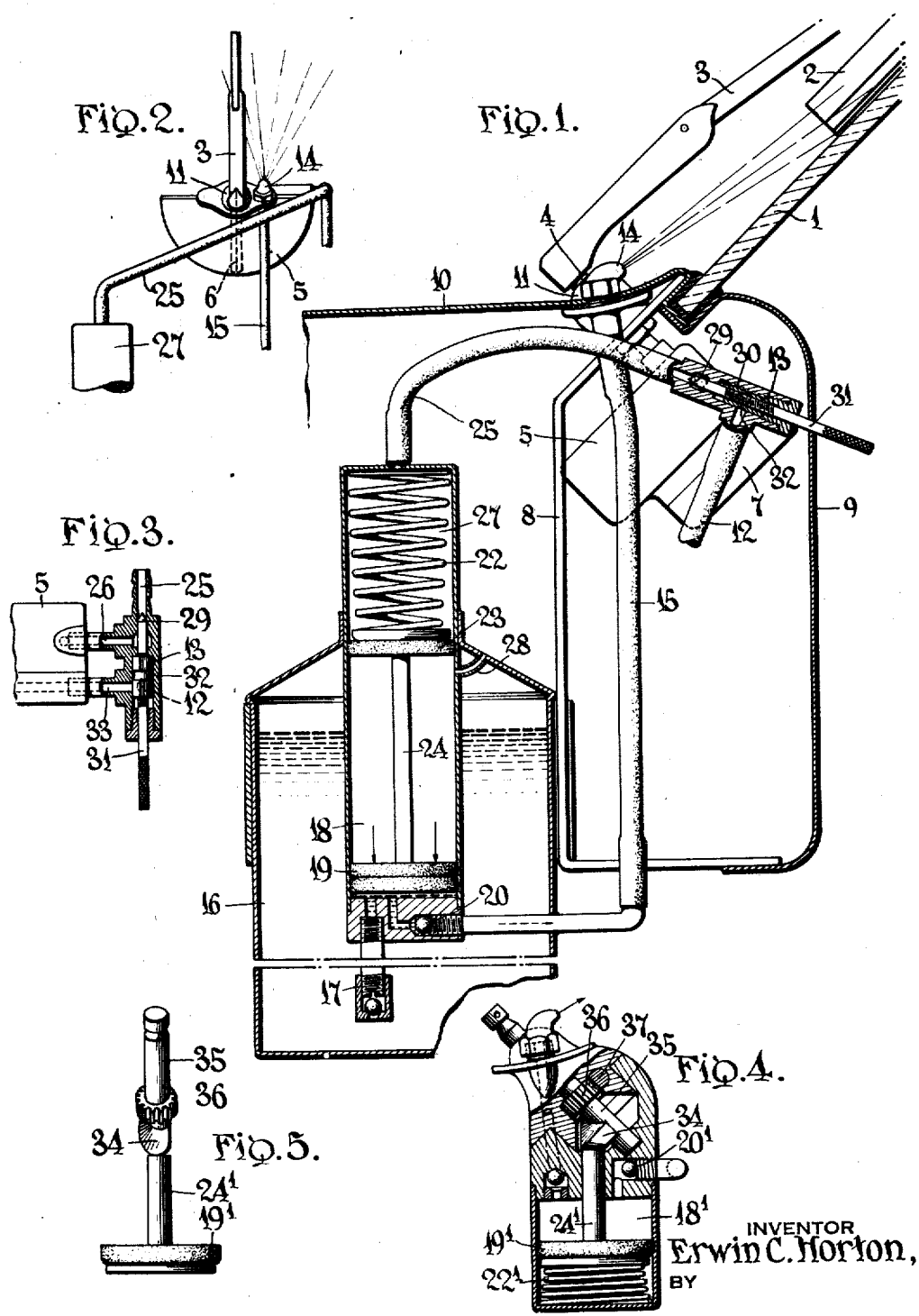
INVENTOR
Erwin C. Horton,
BY
Beau, Brooks, Buckley & Beau. ATTORNEYS Patented Apr. 4, 1939

2,153,519

UNITED STATES PATENT OFFICE 2,153,519

WINDOW CLEARING SYSTEM

Erwin C. Horton, Hamburg, N. Y., assignor to Trico Products Corporation, Buffalo, N. Y.

Application January 21, 1936, Serial No. 60,115

15 Claims. (Cl. 15—250)

This invention relates to a windshield clearing system and it has particular reference to apparatus or means for spraying the window surface with a clearing fluid to maintain a clear field of vision for the motorist.

In devices of this nature heretofore designed, it has been proposed to deposit the clearing fluid on the window surface in the path of the windshield wiper in a continuous manner and without regard to a waste of the fluid.

The present invention has for its object to provide a clearing system in which the clearing fluid is applied to the window surface in a definite and conservative manner to cooperate with the wiping means for greater efficiency. Furthermore, the invention contemplates the fluid being automatically applied to the surface at intervals, so as to avoid waste of the fluid as well as to increase its effectiveness.

The invention further resides in the features of construction and their arrangements and combinations of parts by which the clearing system is rendered reliable and efficient. In the accompanying drawing Fig. 1 is a fragmentary sectional view of a motor vehicle equipped with a windshield clearing system of a preferred embodiment of the present invention;

Fig. 2 is a schematic view illustrating the apparatus in front elevation;

Fig. 3 is a detailed plan view of an operating connection between the windshield cleaner motor and the fluid applicator;

Fig. 4 is a detailed sectional view through a modified form of the invention; and Fig. 5 is a detailed view of the spray piston and its operator.

Referring more particularly to the drawing, the numeral 1 designates a window or windshield of a motor vehicle across which is reciprocated a wiper 2 by the wiper carrying arm 3. The arm is driven from the wiper shaft 4 of the motor 5, the latter having a piston or vane 6 which is oscillated in the motor chamber by the reverse application of the pressure differential as accomplished by means of valve mechanism in valve chamber 7. The motor 5 may be mounted upon a bracket 8 behind the instrument panel 9 and beneath the cowl 10 of the motor vehicle body structure. The motor shaft is projected through the cowl and given proper support by means of the bearing member 11. The motor may be operated by pressure or otherwise, the present disclosure having a pressure line 12 leading from a source of pressure (not shown) through a control valve 13 to the automatic pressure distributing valve mechanism in chamber 7.

The means provided for spraying a clearing fluid on the window so as to loosen such foreign matter as may accumulate incidental to modern conditions of travel, may have the spray nozzle 14 combined with or carried as a part of the bearing member 11. This nozzle is connected by a passage 15 to a source of clearing fluid such as the container 16. A measured quantity or charge of the clearing fluid contained in the tank 16 is taken through a valved inlet 17 into a chamber 18 as the piston or movable wall 19 therein moves to enlarge the chamber capacity. On the reverse stroke of the movable wall 19 the fluid is ejected through a valved outlet 20 and by means of the passage 15 through the spray nozzle 14 on to the window surface.

According to the present invention, means are provided for intermittently spraying a charge of the clearing fluid on the window. In Fig. 1 such means embodies a spring 22 for resiliently urging the movable wall 19 on its fluid expelling stroke, the reverse stroke of the movable wall being imparted by a single acting motor under the control of the wiper operating mechanism. This motor comprises a piston or movable wall 23 which is connected by a rod 24 to the movable wall 19 and is opened to the atmosphere on one side and subjected to the source of pressure on the opposite side by a conduit 25. This conduit is connected to one side of the cleaner motor 5 by conduit 26 so that every time this side of the cleaner motor is connected by its automatic valve mechanism in chamber 7 to the source of operating pressure, the movable wall 23 is likewise subjected to the pressure influence which serves to compress the spring 22 for subsequent release when the valve mechanism next reverses the pressure differential. The fluid is therefore applied intermittently by the cleaner motor.

In the particular illustration, the operating pressure is negative or so-called suction, such as maintains in the intake manifold of the operating motor vehicle engine or as may be developed by a suction pump, and consequently when the adjacent side of the cleaner motor 5 is open to the source of suction the motor chamber 27 of the spray actuating device is likewise open to the source of suction so as to compress the spring 22. When such adjacent side of the motor is disconnected from the source of suction and is open to the atmosphere, like atmospheric communication is provided for the motor chamber 27. The opposite side of the movable wall 23 may be open to the atmosphere through a port 28, if such is desired.

When it is not desired to use the spray, the term spray being used to include any method of applying the fluid, a valve 29, introduced in the passage 25, is closed. This valve 29 may be under a common control with the valve 13 and to this end the latter may be in the form of a sleeve slidably guided in the housing as by means of a feather 30, and stem 31 of the valve 29 may be threaded or otherwise connected thereto so that independent opening of the valve 13 may be effected when desired, the valve sleeve being provided with a groove 32 for interconnecting the pressure passage 12 and the main motor passage 33.

Where the wiper is operated mechanically or electrically it may be desirous to have the fluid ejecting piston 19' (Figs. 4 and 5) operated by mechanical means, such as by means of a cam 34 fixed on the wiper actuating shaft 35. This shaft is illustrated as carrying a pinion 36 adapted to be oscillated by a rack 37 which may be interconnected with another window wiper, where a tandem arrangement of wipers is desired, or to a power drive. In this embodiment of the invention the motor spring 22' will be compressed by the cam 34 as it presses downwardly on the piston rod 24', and as the cam rides out of contact with such rod, the spring 22' will be released for exerting an upward pressure on the clearing fluid in the chamber 18', from which it is ejected through the valved outlet 20'.

In either form of the invention, it will be obvious that as the wiper is oscillated or moved back and forth on the window, the clearing fluid will be deposited on every second stroke of the wiper. This will permit the deposited fluid being thoroughly wiped over the window surface for dissolving or loosening any foreign matter collected thereon, so that when the next charge is forcibly sprayed on the glass the preceding spray will have been applied to the entire surface for greater economy. Further, this action will serve to loosen such foreign matter by reason of its forceful application. When it is desired to discontinue the use of the intermediate application of the fluid, the valve 29 will be closed, as by turning the stem 31 through the valve sleeve 13. When it is desired to completely shut off the cleaner system, a reverse turning of the stem 31 will shift the valve sleeve 13 while maintaining the valve 29 closed.

While the foregoing description has been given in detail, it is not thereby intended to limit the invention, since the inventive principles here involved are applicable to other physical embodiments without departing from the spirit of the invention.

What is claimed is:

1. A window clearing system for motor vehicles, comprising a wiper, means for moving the wiper back and forth on the window surface, and fluid applying means for depositing a clearing fluid on such window surface, said fluid applying means including a fluid expelling motor intermittently operated by said moving means to effect deposition of the clearing fluid on the window surface at intervals.

2. A window clearing system comprising a wiper, means for moving the wiper back and forth on a window surface, a source of clearing fluid, means for applying such clearing fluid on the window surface at predetermined intervals of wiper operation, said fluid applying means embodying a single acting motor, and means for coordinating the wiper moving means with said motor for effecting operation of the fluid applying means with one wiper stroke intervening successive charges of the applied fluid.

3. A window clearing system comprising a wiper, means for moving the wiper back and forth on a window surface, a source of clearing fluid supply, means for applying such clearing fluid on the window surface, said fluid applying means embodying a single acting motor, means for coordinating the wiper moving means with said applying means for effecting operation of the motor intermittently with one wiper stroke intervening successive charges of the fluid, and a common control for said wiper moving means and said motor.

4. A window clearing system comprising a wiper, means for moving the wiper on a window surface, a source of clearing fluid, power operated means for applying such clearing fluid on the window surface, and means operated by the wiper moving means on every other stroke of the wiper for setting said applying means in operation whereby the clearing fluid is always wiped on the surface by said wiper in one direction.

5. A window clearing system having a wiper, and means for moving it on the window surface, combined with fluid applying means, and means for forcibly feeding fluid to said applying means, said feeding means being actuated intermittently by said moving means to wet such window surface.

6. A window clearing system comprising a wiper, means for moving the wiper back and forth on a window surface, a source of clearing fluid, a pump for withdrawing fluid from the source and delivering it on to the window surface, and means coordinated with the wiper moving means for operating the pump on alternate strokes of the wiper.

7. A window clearing system comprising a wiper, means for moving the wiper back and forth on a window surface, a source of clearing fluid, pump means for applying such clearing fluid on to the window surface, said pump means embodying a motor part, and an operative connection between said motor part and said wiper moving means for intermittently actuating the pump means.

8. A window clearing system comprising a wiper, means for moving the wiper back and forth on a window surface, a source of clearing fluid, pump means for applying such clearing fluid on to the window surface, said pump means embodying a motor part, said pump means also embodying a reciprocable wall movable in one direction to intake fluid from the source and in the opposite direction to expel the fluid on to the window surface, and an operative connection between the wiper moving means and the motor part for effecting operation of the movable wall of said pump means on alternate strokes.

9. A window clearing system comprising a wiper, fluid pressure actuated means for moving the wiper back and forth, a source of clearing fluid, and fluid pressure actuated means having fluid communication with the first means and with the source of clearing fluid for applying such clearing fluid on a window surface.

10. A window clearing system comprising a wiper, means for actuating the wiper including a double acting fluid pressure motor operable back and forth by reverse applications of the operating pressure, a source of clearing fluid, and fluid pressure actuated means for applying such clearing fluid on a window surface, said applying means being connected to said double acting fluid pressure motor to receive its operating pressure therefrom on alternate changes of pressure application thereto.

11. A window clearing system comprising a source of clearing fluid, means for applying the clearing fluid to the window surface, fluid pressure actuated means having a line for communication with a supply of operating pressure and operable for feeding the fluid from the source to said applying means, and automatic means interposed in the pressure line for opening and closing the latter, to intermittently subject said feeding means to the operating pressure.

12. A window clearing system comprising a source of clearing fluid, means for applying the fluid on the window surface, a pump for feeding the fluid from the source to said applying means, said pump having a reciprocatory piston backed by a spring for moving the piston on one stroke to expel the clearing fluid, and intermittently operating means for actuating the pump on the reverse stroke for intaking a charge of the clearing fluid from said source.

13. A window clearing system comprising in combination with a source of suction such as that provided by the power plant of a motor vehicle, a source of clearing fluid, suction operated means for pumping the fluid from said fluid source and delivering it onto the window, and means for intermittently connecting said suction operated means to said source of suction in the power plant.

14. A window clearing system comprising in combination with a source of suction such as the intake manifold of a motor vehicle engine, a source of clearing fluid for applying on a window surface to be cleaned, suction operated pump means for applying the clearing fluid to the window surface, said pump means having a reciprocating piston operable on one stroke to intake fluid from the source of clearing fluid, means for urging the pumping means on the return stroke to expel the liquid onto the window surface, and suction actuated means connected to the source of suction and operable intermittently to open and close communication between the pump means and the source of suction whereby said piston will have intaking and expelling strokes imparted thereto.

15. A window clearing system comprising a wiper, a double acting fluid pressure motor having a part operatively connected to the wiper and movable back and forth in a chamber, a source of clearing fluid, a fluid pressure actuated pump having a fluid displacing element movable in one direction for intaking fluid from the source and moving in the opposite direction for expelling the intake fluid onto the window, a passage connecting the pump to the chamber at one side of said part whereby said fluid displacing element is fluid pressure actuated on one stroke when the operating pressure is being applied to the chamber at said one side of said part, and memans independent of said motor for actuating said fluid displacing element on the reverse stroke when the operating pressure is being applied to said opposite side of said part.

ERWIN C. HORTON.

---

CERTIFICATE OF CORRECTION.

Patent No. 2,153,519.                        April 4, 1939.

ERWIN C. HORTON.

It is hereby certified that error appears in the printed specification of the above numbered patent requiring correction as follows: Page 3, second column, line 31, claim 15, for "memans" read means; and that the said Letters Patent should be read with this correction therein that the same may conform to the record of the case in the Patent Office.

Signed and sealed this 9th day of May, A. D. 1939.

Henry Van Arsdale (Seal)                                Acting Commissioner of Patents.

pressure actuated means for applying such clearing fluid on a window surface, said applying means being connected to said double acting fluid pressure motor to receive its operating pressure therefrom on alternate changes of pressure application thereto.

11. A window clearing system comprising a source of clearing fluid, means for applying the clearing fluid to the window surface, fluid pressure actuated means having a line for communication with a supply of operating pressure and operable for feeding the fluid from the source to said applying means, and automatic means interposed in the pressure line for opening and closing the latter, to intermittently subject said feeding means to the operating pressure.

12. A window clearing system comprising a source of clearing fluid, means for applying the fluid on the window surface, a pump for feeding the fluid from the source to said applying means, said pump having a reciprocatory piston backed by a spring for moving the piston on one stroke to expel the clearing fluid, and intermittently operating means for actuating the pump on the reverse stroke for intaking a charge of the clearing fluid from said source.

13. A window clearing system comprising in combination with a source of suction such as that provided by the power plant of a motor vehicle, a source of clearing fluid, suction operated means for pumping the fluid from said fluid source and delivering it onto the window, and means for intermittently connecting said suction operated means to said source of suction in the power plant.

14. A window clearing system comprising in combination with a source of suction such as the intake manifold of a motor vehicle engine, a source of clearing fluid for applying on a window surface to be cleaned, suction operated pump means for applying the clearing fluid to the window surface, said pump means having a reciprocating piston operable on one stroke to intake fluid from the source of clearing fluid, means for urging the pumping means on the return stroke to expel the liquid onto the window surface, and suction actuated means connected to the source of suction and operable intermittently to open and close communication between the pump means and the source of suction whereby said piston will have intaking and expelling strokes imparted thereto.

15. A window clearing system comprising a wiper, a double acting fluid pressure motor having a part operatively connected to the wiper and movable back and forth in a chamber, a source of clearing fluid, a fluid pressure actuated pump having a fluid displacing element movable in one direction for intaking fluid from the source and moving in the opposite direction for expelling the intake fluid onto the window, a passage connecting the pump to the chamber at one side of said part whereby said fluid displacing element is fluid pressure actuated on one stroke when the operating pressure is being applied to the chamber at said one side of said part, and memans independent of said motor for actuating said fluid displacing element on the reverse stroke when the operating pressure is being applied to said opposite side of said part.

ERWIN C. HORTON.

---

CERTIFICATE OF CORRECTION.

Patent No. 2,153,519. April 4, 1939.

ERWIN C. HORTON.

It is hereby certified that error appears in the printed specification of the above numbered patent requiring correction as follows: Page 3, second column, line 31, claim 15, for "memans" read means; and that the said Letters Patent should be read with this correction therein that the same may conform to the record of the case in the Patent Office.

Signed and sealed this 9th day of May, A. D. 1939.

Henry Van Arsdale (Seal) Acting Commissioner of Patents.